United States Patent
Litvinov et al.

(10) Patent No.: US 6,816,339 B1
(45) Date of Patent: Nov. 9, 2004

(54) PERPENDICULAR MAGNETIC RECORDING HEAD WITH LONGITUDINAL MAGNETIC FIELD GENERATOR TO FACILITATE MAGNETIZATION SWITCHING

(75) Inventors: Dmitri Litvinov, Pittsburgh, PA (US); Sakhrat Khizroev, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 94 days.

(21) Appl. No.: 09/757,837

(22) Filed: Jan. 10, 2001

Related U.S. Application Data

(60) Provisional application No. 60/175,266, filed on Jan. 10, 2000, and provisional application No. 60/248,517, filed on Nov. 14, 2000.

(51) Int. Cl.⁷ .......................... G11B 5/147; G11B 5/17
(52) U.S. Cl. .......................... 360/125; 360/126
(58) Field of Search .......................... 360/125, 126, 360/318, 318.1, 110, 321

(56) References Cited

U.S. PATENT DOCUMENTS

| | | | |
|---|---|---|---|
| 3,683,407 A | * 8/1972 | Maynard et al. | 360/123 |
| 3,921,218 A | * 11/1975 | Kayser | 360/316 |
| 3,982,234 A | * 9/1976 | Voegeli | 365/32 |
| 4,138,702 A | 2/1979 | Magnenet | |
| 4,253,127 A | * 2/1981 | Kodama et al. | 360/125 |
| 4,277,809 A | * 7/1981 | Fisher et al. | 360/110 |
| 4,317,148 A | * 2/1982 | Chi | 360/119 |
| 4,356,523 A | * 10/1982 | Yeh | 360/315 |
| 4,410,603 A | * 10/1983 | Yamamori et al. | 428/611 |
| 4,423,450 A | * 12/1983 | Hamilton | 360/111 |
| 4,541,026 A | 9/1985 | Bonin et al. | |
| 4,575,777 A | 3/1986 | Hosokawa | |
| 4,613,918 A | 9/1986 | Kanai et al. | |
| 4,649,449 A | 3/1987 | Sawada et al. | |
| 4,725,909 A | * 2/1988 | Kawai | 360/126 |
| 4,751,598 A | 6/1988 | Hamilton | |
| 4,782,415 A | * 11/1988 | Vinal | 360/123 |
| 4,974,110 A | 11/1990 | Kanamine et al. | |
| 4,982,301 A | * 1/1991 | Endo | 360/125 |
| 5,041,932 A | * 8/1991 | Hamilton | 360/126 |
| 5,057,957 A | 10/1991 | Ito et al. | |
| RE33,949 E | 6/1992 | Mallary et al. | |
| 5,225,953 A | 7/1993 | Wada et al. | |
| 5,333,086 A | 7/1994 | Frey et al. | |
| 5,396,391 A | 3/1995 | Tanaka et al. | |
| RE35,212 E | * 4/1996 | Barnes et al. | 505/171 |
| 5,589,262 A | * 12/1996 | Kiuchi et al. | 428/336 |
| 5,870,260 A | * 2/1999 | Davies et al. | 360/115 |
| 5,933,299 A | * 8/1999 | Tanaka et al. | 360/125 |
| 5,942,342 A | * 8/1999 | Hikosaka et al. | 428/694 R |

OTHER PUBLICATIONS

Mee, Denis C. and Daniel, Eric D. Magnetic Recording Handbook. 1990. McGraw Hills Publishing Company. pp. 277–283.*

* cited by examiner

Primary Examiner—George J. Letscher
Assistant Examiner—C R Magee
(74) Attorney, Agent, or Firm—Alan G. Towner, Esq.; Pietragallo, Bosick & Gordon

(57) ABSTRACT

A perpendicular magnetic recording head includes a perpendicular writing pole and a longitudinal field generator which rotates the magnetization of the perpendicular recording media prior to writing, thereby facilitating magnetization switching. The longitudinal magnetic field may be provided by a narrowed gap between the trailing write pole and the leading return pole of the head. The gap structure is designed to provide a fringing magnetic field between the poles which generates the longitudinal magnetic field in perpendicular recording media as the media travels under the perpendicular writing pole.

20 Claims, 3 Drawing Sheets

PERPENDICULAR MAGNETIC RECORDING HEAD WITH LONGITUDINAL MAGNETIC FIELD GENERATOR TO FACILITATE MAGNETIZATION SWITCHING

CROSS REFERENCE TO RELATED APPLICATIONS

This application claims the benefit of U.S. Provisional Patent Application Ser. No. 60/175,266 filed Jan. 10, 2000 and U.S. Provisional Patent Application Ser. No. 60/248,517 filed Nov. 14, 2000.

FIELD OF THE INVENTION

The present invention relates to magnetic recording heads, and more particularly relates to perpendicular magnetic recording heads including a longitudinal magnetic field generator which facilitates magnetization switching of a perpendicular recording media during writing operations.

BACKGROUND INFORMATION

Magnetic hard disk drives incorporating longitudinal recording heads are well known. However, as the magnetic volumes of recording bits decrease to support higher areal bit densities, conventional longitudinal media are subject to superparamagnetic instabilities which limit recording densities.

Perpendicular recording heads which have been developed for use in hard disk drive systems may potentially increase recording densities in comparison with standard longitudinal recording heads. However, perpendicular designs may also be subject to limitations.

The magnetization switching of a recording bit in perpendicular magnetic recording may be a slower process than magnetization switching in longitudinal recording. The rate of media magnetization switching or rotation is determined by the magnitude of the torque applied to the magnetic moment of a bit, as defined by the equation:

$$\frac{dm}{dt} = \tau = \gamma m \times H_{eff};$$

where m is the magnetic moment and $H_{eff}$ is the effective magnetic field with damping ignored. In longitudinal recording, several factors contribute to the cross product in this equation. Strong demagnetization fields at bit transitions ($\sim 2\pi M_s$ of the media) are perpendicular to the plane of the disk (and to the direction of m). The fields generated by a standard longitudinal ring head have substantial perpendicular components ($\sim 2\pi M_s$ of the yoke material). Also, since conventional longitudinal media is not oriented in the plane of the film, a substantial amount of the grains will have their hard axes oriented at angles far away from zero degrees, resulting in a non-zero cross product in the foregoing equation. Longitudinal designs thus provide fast rotation of the magnetization during switching.

The geometry is not as favorable in perpendicular recording. In conventional perpendicular head designs, the longitudinal component of the magnetic field is negligible. If the recording media is well aligned, the value of the cross product in the above equation is very small and thus the switching speed is slow. This raises serious concerns about recording dynamics in perpendicular recording systems. The present invention has been developed in view of the foregoing.

SUMMARY OF THE INVENTION

The present perpendicular recording head is designed to significantly improve dynamics of the recording process by generating a longitudinal magnetic field in the recording layer of the recording media which rotates the magnetization prior to writing. In an embodiment, this is accomplished by reducing the gap between the leading and trailing poles of the perpendicular recording head.

A feature of the present head design is the rotation of the recording fields to facilitate magnetization switching. The recording area, moving underneath the recording head, first sees the fringing fields generated in the gap of the recording head. These fields have both longitudinal and perpendicular components, e.g., both $\sim 2\pi M_s$ of the yoke material in magnitude. As used herein, the term "longitudinal magnetic field" includes fields generated in the perpendicular recording layer having a component parallel with the plane of the recording layer. The longitudinal component of the longitudinal magnetic field forces the magnetization in the recording layer to precess from its perpendicular or vertical orientation. By the time the perpendicular field ($\sim 4\pi M_s$ of the yoke material) from the trailing pole of the writer reaches the recording area, the magnetization in the recording layer region to be written into is no longer perpendicular to the plane of the disk, thus leading to a non-zero cross-product. The gap width may be on the order of the distance between the air bearing surface (ABS) and the soft underlayer of the recording media.

An aspect of the present invention is to provide a perpendicular magnetic recording head comprising a trailing write pole and leading return pole, and means for rotating magnetization of a perpendicular magnetic recording media as the media passes under the recording head from the leading pole to the trailing pole.

Another aspect of the present invention is to provide a perpendicular magnetic recording head comprising a trailing perpendicular write pole, a leading return pole, and a gap between the write pole and return pole structured and arranged to generate a longitudinal magnetic field between the poles when magnetic flux is induced in the poles.

A further aspect of the present invention is to provide a perpendicular magnetic recording system comprising a perpendicular magnetic recording medium including a hard magnetic recording layer and a soft magnetic underlayer, and a perpendicular magnetic recording head positionable over the medium. The recording head comprises a trailing perpendicular write pole, a leading return pole, and a gap between the perpendicular write pole and return pole structured and arranged to generate a longitudinal magnetic field in the hard magnetic recording layer when magnetic flux is induced in the poles.

These and other aspects of the present invention will be more apparent from the following description.

DETAILED DESCRIPTION

Figure 1:
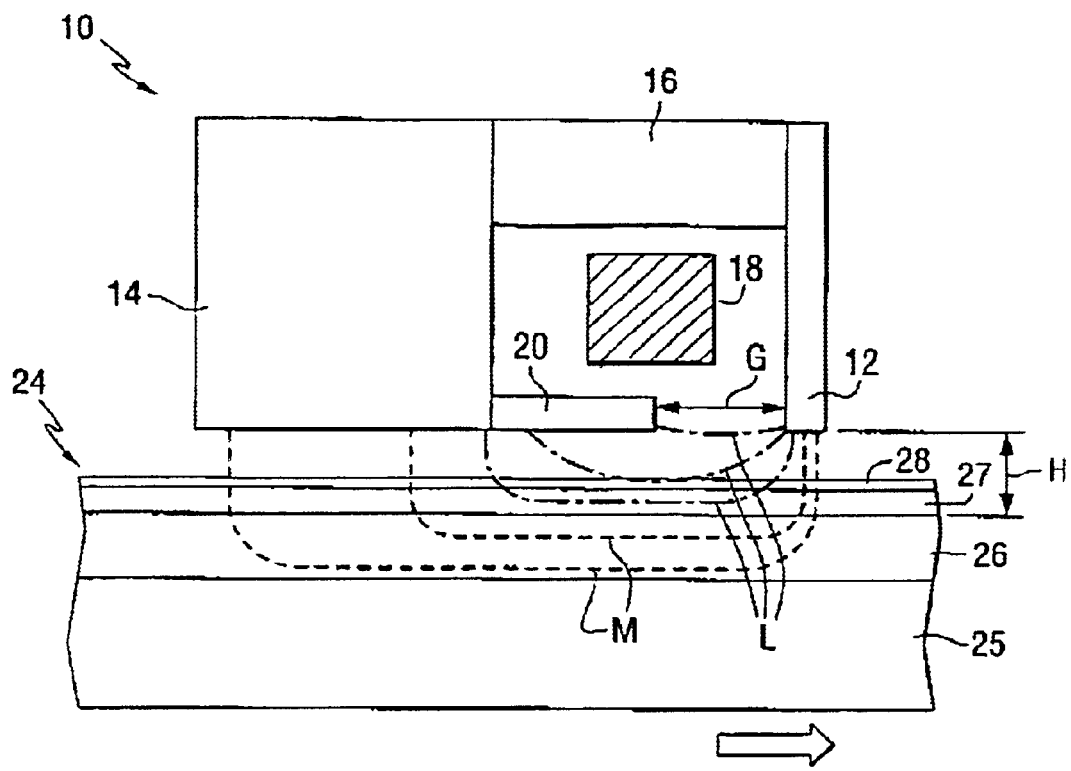
FIG. 1 is a partially schematic side view of a perpendicular magnetic recording head including a narrowed gap between the writing pole and return pole which generates a longitudinal magnetic field in accordance with an embodiment of the present invention.

FIG. 1 is a partially schematic side view of a perpendicular magnetic recording head 10 in accordance with an embodiment of the present invention. The recording head 10 includes a trailing main write pole 12 and a leading return pole 14. A yoke 16 connects the main pole 12 to the return pole 14. An electrically conductive line 18, shown in cross-section in FIG. 1, extends adjacent to the main pole 12. An extension 20 extends from the return pole 14. The main pole 12, return pole 14, yoke 16 and extension 20 are made of any suitable magnetically permeable material such as NiFe, FeAlN, FeTaN, CoFe, CoFeB, CoFeN or any other soft magnetic materials, including multiple layers of such materials. The conductive line 18 may be made of any suitable electrically conductive material such as Cu, Ag, Au or any other high conductivity materials or alloys.

As shown in FIG. 1, the recording head 10 is positioned over a recording disk 24 which travels in the direction of the arrow shown in FIG. 1 during recording operations. The disk 24 includes a substrate 25, a soft magnetic underlayer 26, a hard magnetic recording layer 27 and a protective layer 28. The disk 24 may also include a magnetic decouple layer (not shown) between the soft underlayer 26 and recording layer 27. The tip of the main pole 12 is positioned a distance H above the upper surface of the soft underlayer 26. The end of the extension 20 is positioned a gap distance G from the main pole 12. The height distance H and gap distance G may be within an order of magnitude of each other. The ratio of G:H may be from about 1:10 to about 10:1, for example, from about 1:1 to about 2:1. In an embodiment, the gap distance G may range from about 0.03 to about 0.5 micron, for example, from about 0.03 to about 0.1 micron. The height distance H may range from about 0.01 to about 0.05 micron, for example, from about 0.01 to about 0.02 micron.

As illustrated in FIG. 1, when current flows through the conductive line 18, a magnetic field is induced in the write pole 12. A portion of the induced magnetic field M travels from the tip of the write pole 12 perpendicularly through the recording layer 27, then across the soft underlayer 26 and back to the return pole 14. Another portion of the magnetic flux L travels from the tip and/or side of the main pole 12 to the extension 20. The magnetic flux L generates a longitudinal magnetic field within or adjacent to the recording layer 27. As more fully described below, the longitudinal magnetic field causes magnetization rotation within the recording layer 27 which facilitates subsequent perpendicular magnetic recording by the flux M from the tip of the main pole 12.

Figure 2:
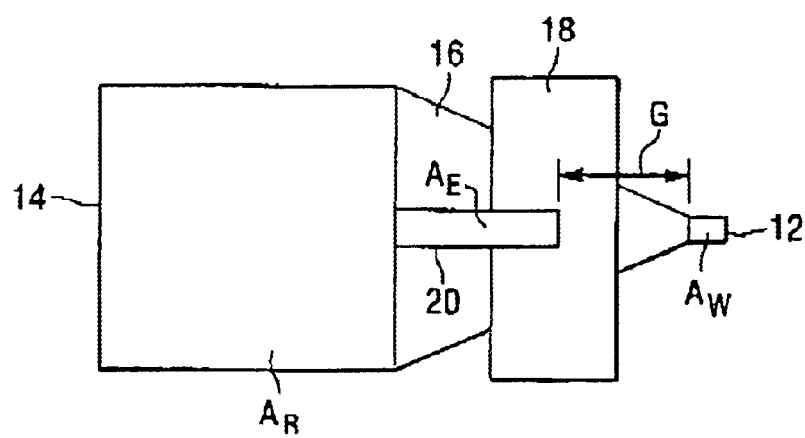
FIG. 2 is a bottom view of the recording head of FIG. 1.

FIG. 2 is a bottom view of the recording head 10 of FIG. 1. The main pole tip 12 has a substantially smaller surface area $A_W$ at the air bearing surface in comparison with the surface area $A_R$ of the return pole 14. The surface area $A_E$ of the extension 20 at the air bearing surface may be greater than the surface area $A_W$ of the tip of the main pole 12, but less than the surface area $A_R$ of the return pole 14.

Figure 3A:
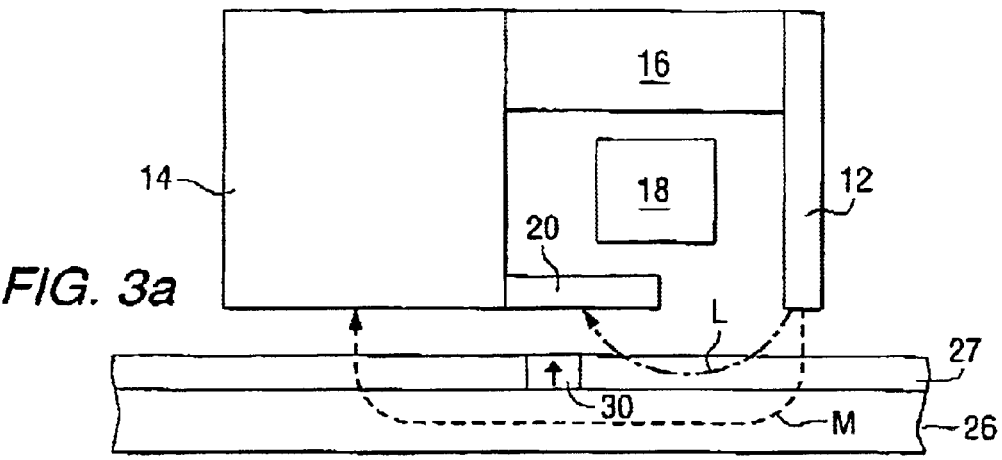
FIGS. 3a–3c illustrate a magnetic data bit of a perpendicular recording disk as it passes under a perpendicular magnetic recording head of FIG. 1.
Figure 3B:
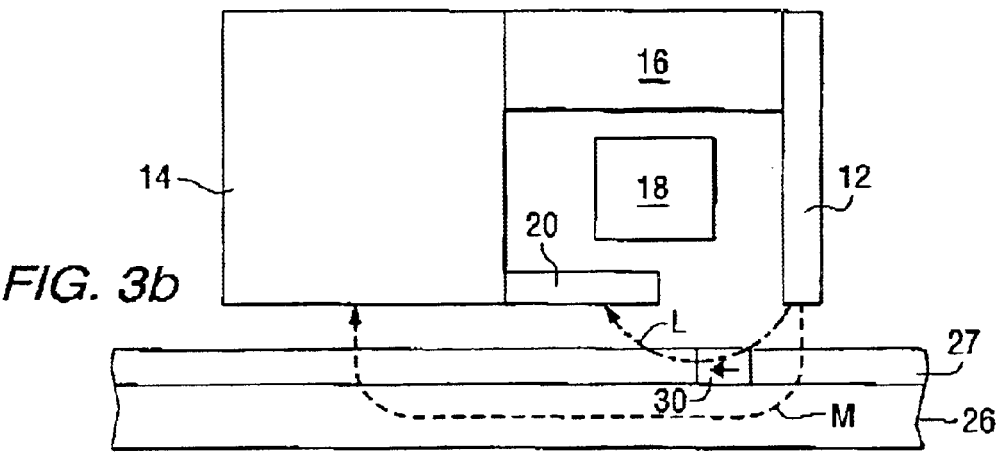
Figure 3C:
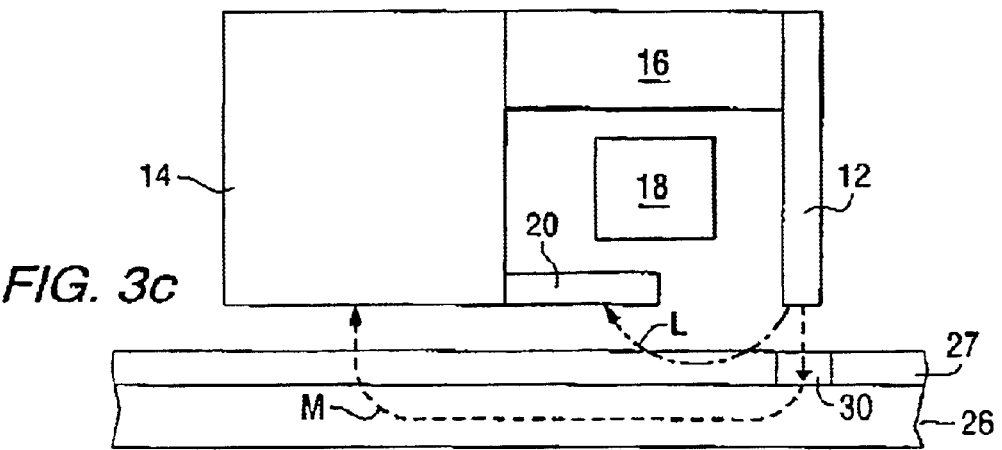

FIGS. 3a–3c schematically illustrate a magnetic data bit 30 within a track of the recording layer 27 as the bit 30 travels underneath the recording head 10. For purposes of clarity, only the recording layer 27 and soft underlayer 26 of the recording disk are illustrated in FIGS. 3a–3c. In FIG. 3a, the bit 30 has an upward magnetization perpendicular to the plane of the recording layer 27. As the bit 30 travels to the position shown in FIG. 3b, the flux pattern L generates a longitudinal magnetic field within or adjacent to the bit 30. The longitudinal magnetic field causes the magnetization of the bit 30 to rotate approximately 90 degrees to a direction substantially parallel with the plane of the recording layer 27. Subsequently, the bit 30 travels to the position shown in FIG. 3c. At this location, the magnetization of the bit 30 switches from the longitudinal orientation shown in FIG. 3b to a perpendicular orientation. Thus, as illustrated in FIGS. 3a–3c, the longitudinal magnetic field generated by the flux pattern L causes the magnetization of the bit 30 to rotate to a substantially longitudinal orientation just before the bit 30 is written by the main pole 12.

Figure 4:
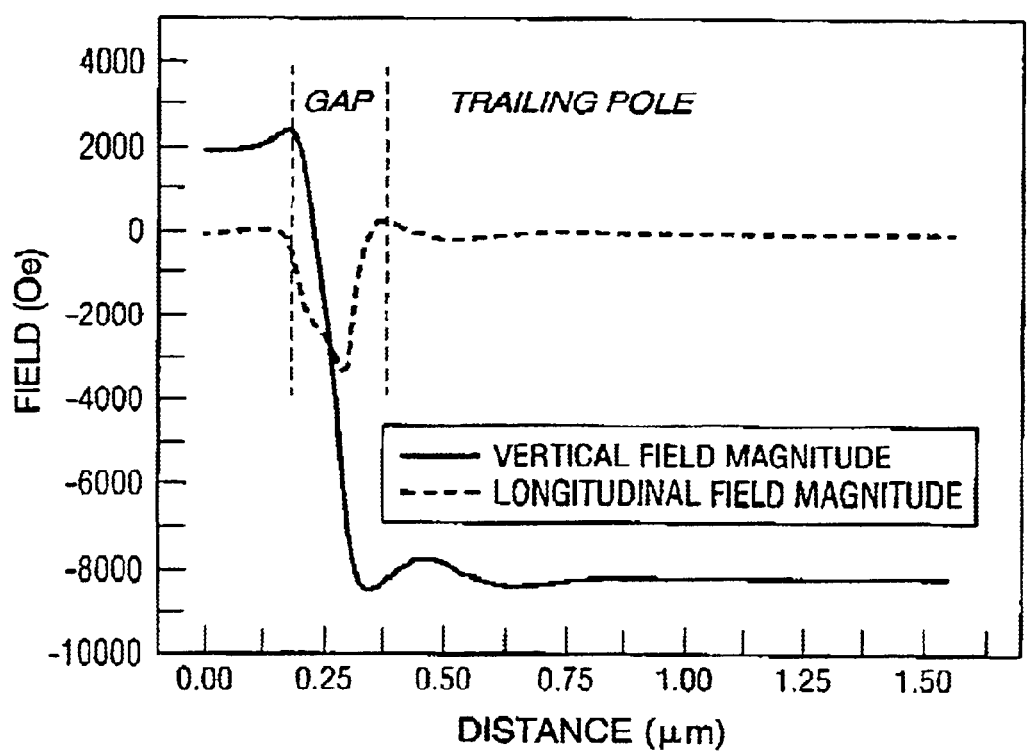
FIG. 4 is a graph of perpendicular and longitudinal magnetic field profiles along a recording track of a magnetic disk which may be generated during operation of a recording head of the present invention.

FIG. 4 shows perpendicular and longitudinal field profiles along the recording tack from a recording head in accordance with the present invention. As shown in FIG. 4, a significant longitudinal component of the field exists in the gap region. In accordance with the present invention, the longitudinal component of the field will cause magnetization in the recording layer to deflect from its equilibrium perpendicular or vertical orientation so that the vertical field under the trailing pole will act upon magnetization that is not vertically aligned. Thus, a significant torque can be developed to promote fast magnetization switching.

The present head is designed such that there is enough time for the trailing edge of the writing pole to reach the position above the recording media where the longitudinal component from the leading edge starts to switch the media in the period to time corresponding to the shortest switching cycle. For example, in a 30,000 rpm drive with a 3 cm disk radius and 1,000 Gflux/s recording rate, the distance traveled by the head relative to the disk surface in one cycle is about 0.1 micron. This constrains the maximum trailing pole thickness in the direction measured along the track. This constraint may be tightened or relaxed depending on the recording rate, the rotation speed and the radius at which the recording process occurs.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording head comprising:
   a trailing perpendicular write pole;
   a leading return pole; and
   a gap between the write pole and return pole structured and arranged to generate a longitudinal magnetic field between the poles when magnetic flux is induced in the poles, wherein the return pole comprises an extension which forms the gap, and the extension projects from the return pole toward the write pole.

2. The perpendicular magnetic recording head of claim 1, wherein the extension projects from the return pole in a direction substantially parallel with an air bearing surface of the recording head.

3. The perpendicular magnetic recording head of claim 1, wherein the gap has a distance of from about 0.03 to about 0.5 micron.

4. The perpendicular magnetic recording head of claim 1, wherein the gap has a distance of from about 0.03 to about 0.1 micron.

5. A perpendicular magnetic recording system comprising:
   (a) a perpendicular magnetic recording medium including a hard magnetic recording layer and a soft magnetic underlayer; and
   (b) a perpendicular magnetic recording head positionable over the medium, the recording head comprising:

(i) a trailing perpendicular write pole;
(ii) a leading return pole; and
(iii) a gap between the perpendicular write pole and return pole structured and arranged to generate a longitudinal magnetic field in the hard magnetic recording layer sufficient to rotate magnetization and facilitate magnetization switching in the hard magnetic recording layer when magnetic flux is induced in the poles.

6. The perpendicular magnetic recording system of claim 5, wherein the return pole comprises an extension that forms the gap.

7. The perpendicular magnetic recording system of claim 6, wherein the extension projects from the return pole in a direction substantially parallel with an air bearing surface of the recording head.

8. The perpendicular magnetic recording system of claim 5, wherein the gap has a distance of from about 0.03 to about 0.5 micron.

9. The perpendicular magnetic recording system of claim 5, wherein the gap has a distance of from about 0.03 to about 0.1 micron.

10. The perpendicular magnetic recording system of claim 5, wherein the write pole has a tip located a distance H above the soft magnetic underlayer of from about 0.01 to about 0.05 micron.

11. The perpendicular magnetic recording system of claim 5, wherein the write pole has a tip located a distance H above the soft magnetic underlayer of from about 0.01 to about 0.02 micron.

12. The perpendicular magnetic recording system of claim 5, wherein the write pole has a tip located a distance H above the soft magnetic underlayer, and the ratio of the gap distance to the distance H is from about 1:10 to about 10:1.

13. The perpendicular magnetic recording system of claim 5, wherein the write pole has a tip located a distance H above the soft magnetic underlayer, and the ratio of the gap distance to the distance H is from about 1:1 to about 2:1.

14. A magnetic recording head comprising:
a trailing pole and a leading pole; and
means for rotating magnetization in a hard magnetic recording layer of a magnetic recording media as the media passes under the recording head from the leading pole to the trailing pole before the hard magnetic recording layer is written by the trailing pole in order to facilitate magnetization switching in the hard magnetic recording layer, wherein the means for rotating magnetization comprises a gap between the trailing pole and the leading pole structured and arranged to generate a longitudinal magnetic field in the hard magnetic recording layer between the poles when magnetic flux is induced in the poles.

15. The magnetic recording head of claim 14, wherein the leading pile comprises an extension which forms the gap.

16. The magnetic recording head of claim 15, wherein the extension projects from the leading pole in a direction substantially parallel with an air bearing surface of the recording head.

17. The magnetic recording head of claim 14, wherein the gap has a distance of from about 0.03 to about 0.5 micron.

18. The magnetic recording head of claim 14, wherein the gap has a distance of from about 0.03 to about 0.1 micron.

19. The magnetic recording head of claim 14, wherein the recording head is a perpendicular magnetic recording head.

20. The magnetic recording head of claim 14, wherein the means for rotating magnetization rotates magnetization in the hard magnetic recording layer approximately 90 degrees.

* * * * *

UNITED STATES PATENT AND TRADEMARK OFFICE
CERTIFICATE OF CORRECTION

PATENT NO. : 6,816,339 B1
DATED : November 9, 2004
INVENTOR(S) : Dmitri Litvinov and Sakhrat Khizroev It is certified that error appears in the above-identified patent and that said Letters Patent is hereby corrected as shown below:

Column 6,
Line 20, "pile" should read -- pole --.

Signed and Sealed this

Twenty-eighth Day of March, 2006

JON W. DUDAS
*Director of the United States Patent and Trademark Office*